US010936282B2

(12) United States Patent
Shahin (10) Patent No.: US 10,936,282 B2
(45) Date of Patent: Mar. 2, 2021

(54) SYSTEM FOR PROCESSING MULTI-LEVEL CONDITION DATA TO ACHIEVE STANDARDIZED PRIORITIZATION

(71) Applicant: United States of America as Represented by The Secretary of The Army, Alexandria, VA (US)

(72) Inventor: Mohamed Y. Shahin, Windsor, CO (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 131 days.

(21) Appl. No.: 15/909,903

(22) Filed: Mar. 1, 2018

(65) Prior Publication Data

US 2018/0196638 A1    Jul. 12, 2018

Related U.S. Application Data

(63) Continuation-in-part of application No. 13/291,248, filed on Nov. 8, 2011, now abandoned.

(51) Int. Cl.
| G06F 7/08 | (2006.01) |
| G06F 16/22 | (2019.01) |
| G06F 16/23 | (2019.01) |
| G06Q 10/06 | (2012.01) |
| G06Q 50/08 | (2012.01) |

(52) U.S. Cl.
CPC ............ *G06F 7/08* (2013.01); *G06F 16/2228* (2019.01); *G06F 16/2379* (2019.01); *G06Q 10/0631* (2013.01); *G06Q 50/08* (2013.01)

(58) Field of Classification Search
CPC ........................................................ G06F 7/08
USPC ........................................................ 702/184
See application file for complete search history.

(56) References Cited

U.S. PATENT DOCUMENTS

| 6,820,038 | B1 * | 11/2004 | Wetzer | G06Q 10/08 |
| | | | | 702/184 |
| 7,308,385 | B2 * | 12/2007 | Wegerich | G05B 23/0254 |
| | | | | 700/108 |
| 7,769,568 | B2 * | 8/2010 | Marrano | G06Q 10/06 |
| | | | | 703/2 |
| 8,155,989 | B2 * | 4/2012 | Baskin | G06Q 10/08 |
| | | | | 705/7.12 |
| 8,352,216 | B2 * | 1/2013 | Subbu | G05B 23/024 |
| | | | | 700/108 |
| 2011/0137711 | A1 * | 6/2011 | Singh | G06Q 10/06 |
| | | | | 705/7.38 |
| 2011/0196621 | A1 * | 8/2011 | Huyse | F16L 1/036 |
| | | | | 702/34 |

* cited by examiner

*Primary Examiner* — Ricky Ngon
(74) *Attorney, Agent, or Firm* — Brian C. Jones (57) ABSTRACT

A method for adjusting a complex index with inherent anomalies due to the presence of multiple quality levels of the same indexed characteristic in a single sample. Select embodiments of the present invention provide for adjusting the complex index where at least two or three quality levels of the same characteristic are present in the inspection sample. Various embodiments of the present invention provide an adjustment for a pavement condition index (PCI) established with ranges of severity estimated as low, medium and high for each distress type.

20 Claims, 6 Drawing Sheets

| Distress Type | | PCI for Severity Ratios of: | | | | | Description |
|---|---|---|---|---|---|---|---|
| | Description | 100 H | 50:50 H:M | 50:50 H:L | 100 M | 50:50 M:L | |
| Asphalt | | | | | | | |
| 41 | Alligator / Fatigue Cracking | - | - | - | 16 | 9 | PCI lower than 100% Medium |
| 43 | Block Cracking | - | - | - | 16 | 9 | PCI lower than 100% Medium |
| 52 | Weathering and Raveling | 30 | 26 | 28 | - | - | PCI's both lower than 100% High |
| Concrete | | | | | | | |
| 61 | Blow Up | - | - | - | 15 | 15 | PCI same as 100% Medium |
| 63 | Cracks, Long / Trans / Diag | 15 | 11 | - | - | - | PCI lower than 100% High |
| 64 | Durability Cracking | 12 | 10 | - | - | - | PCI lower than 100% High |
| 66 | Patching, Small | - | - | - | 78 | 78 | PCI equal to 100% Medium |
| 70 | Weathering / Scaling / | 12 | 10 | - | - | - | PCI lower than 100% High |
| 71 | Settlement | - | - | - | 43 | 42 | PCI lower than 100% Medium |
| 72 | Shattered Slab | - | - | - | 16 | 14 | PCI lower than 100% Medium |
| 74 | Spalling, Trans / Long | 48 | 41 | - | - | - | PCI lower than 100% High |
| 75 | Spalling, Corner | - | - | - | 72 | 72 | PCI equal to 100% Medium |

Figure 3a

| Severity % | | PCI | Remarks |
|---|---|---|---|
| Medium | High | | |
| 20 | 0 | 45 | Valid value of PCI for a single severity (Med) |
| 19 | 1 | 39 | |
| 18 | 2 | 34 | |
| 17 | 3 | 31 | |
| 16 | 4 | 30 | |
| 15 | 5 | 28 | |
| 14 | 6 | 27 | |
| 13 | 7 | 27 | |
| 12 | 8 | 26 | |
| 11 | 9 | 26 | |
| 10 | 10 | 26 | |
| 9 | 11 | 26 | |
| 8 | 12 | 26 | |
| 7 | 13 | 26 | |
| 6 | 14 | 27 | |
| 5 | 15 | 27 | |
| 4 | 16 | 29 | |
| 3 | 17 | 29 | |
| 2 | 18 | 29 | |
| 1 | 19 | 28 | |
| 0 | 20 | 29 | Valid value of PCI for a single severity (High) |

Figure 3b

| SEVERITY % | | EXISTING PCI | ADJUSTED PCI |
|---|---|---|---|
| MEDIUM | HIGH | | |
| 20 | 0 | 45 | 45 |
| 19 | 1 | 39 | 39 |
| 18 | 2 | 34 | 34 |
| 17 | 3 | 31 | 31 |
| 16 | 4 | 30 | 30 |
| 15 | 5 | 28 | 29 |
| 14 | 6 | 27 | 29 |
| 13 | 7 | 27 | 29 |
| 12 | 8 | 26 | 29 |
| 11 | 9 | 26 | 29 |
| 10 | 10 | 26 | 29 |
| 9 | 11 | 26 | 29 |
| 8 | 12 | 26 | 29 |
| 7 | 13 | 26 | 29 |
| 6 | 14 | 27 | 29 |
| 5 | 15 | 27 | 29 |
| 4 | 16 | 29 | 29 |
| 3 | 17 | 29 | 29 |
| 2 | 18 | 29 | 29 |
| 1 | 19 | 28 | 29 |
| 0 | 20 | 29 | 29 |

Figure 4a

| Distress | Description | Maximum Differences in PCI | | | |
|---|---|---|---|---|---|
| | | 3-Severity Level Case | | 2-Severity Level Case | |
| | | Before Adjusting | After Adjusting | Before Adjusting | After Adjusting |
| Asphalt | | | | | |
| 1 | Alligator / Fatigue Cracking | 13 | 1 | 3 | 1 |
| 3 | Block Cracking | 2 | 0 | | |
| 19 | Weathering and Raveling | 2 | 0 | | |
| 41 | Alligator Cracking | 9 | 4 | 5 | 2 |
| 43 | Block Cracking | 6 | 0 | | |
| 52 | Weathering / Raveling | 9 | 0 | 3 | 1 |
| Concrete | | | | | |
| 24 | Durability Cracking | 2 | 1 | | |
| 25 | Faulting | 2 | 0 | 2 | 0 |
| 28 | Linear Cracking | 2 | 0 | | |
| 36 | Scaling | 2 | 0 | | |
| 39 | Joint Spalling | 2 | 0 | | |
| 63 | Cracks, Long / Trans / Diag | 5 | 0 | 5 | 0 |
| 64 | Durability Cracking | 4 | 1 | | |
| 70 | Scaling / Weathering | 4 | 1 | | |
| 71 | Settlement | 3 | 1 | | |
| 74 | Spalling, Trans / Long | 7 | 1 | | |

Figure 4b

SYSTEM FOR PROCESSING MULTI-LEVEL CONDITION DATA TO ACHIEVE STANDARDIZED PRIORITIZATION

CROSS-REFERENCE TO RELATED APPLICATIONS

This application is a continuation-in-part and claims the benefit of U.S. patent application Ser. No. 13/291,248 filed Nov. 8, 2011. The above application is incorporated by reference herein.

STATEMENT REGARDING FEDERALLY SPONSORED RESEARCH OR DEVELOPMENT

The invention described herein was made by an employee of the United States Government and may be manufactured and used by the Government of the United States of America for governmental purposes without the payment of any royalties thereon or therefore.

FIELD OF INVENTION

This invention relates to the field of computational devices and more specifically to an apparatus for accurately prioritizing infrastructure maintenance.

BACKGROUND OF THE INVENTION

Overview

The U.S. Army Corps of Engineers (USACE) is responsible for the repair and maintenance of billions of dollars of infrastructure assets, including roads and buildings. The government and industry use standardized classification systems to assess and rank the condition in order of these assets to prioritize repairs and allocate resources.

According to one standardized classification system, cracks or faults in roadways are assigned as low, medium, or high severity to be assigned a numerical score by type and frequency.

The severity of each deterioration factor identified in an asset is recorded, and the frequency of occurrences is tracked. An asset having less severe manifestations of a deterioration factor may have a higher density (more frequent) manifestations. Conversely, an asset with few manifestations of a deterioration factor could have instances which are severe and warrant more immediate attention.

It is a problem known in the art that it is difficult to compare assets having many instances of deterioration factors at multiple levels of severity, and to accurately prioritize them for repair. For example, it is difficult to determine how particular assets including roads, bridges, walls, and other structures exhibiting anywhere from dozens to thousands of deterioration factors having various levels of severity and density should be prioritized. There is an unmet need for a computer system which can compare multiple assets exhibiting large numbers of instances of deterioration factors at different levels of severity and frequency.

PAVER™ is a successful pavement management system developed by the US Army Corps of Engineers, Engineer Research and Development Center (ERDC), Construction Engineering Research Laboratory (CERL). PAVER™ aids M&R managers in deciding when and where to apply resources for pavement M&R. PAVER™ is used to: develop and organize the pavement inventory; assess the current condition of pavements; develop models to predict future conditions; report on past and estimate future pavement performance; and develop scenarios for M&R based on budget or condition requirements.

Analysis of the Prior Art

The Pavement Condition Index (PCI) is a numerical index between 0 and 100 which is used, to indicate the general condition of a pavement. The method is based on a visual survey of the number and types of distresses in a pavement. The result of the analysis is a numerical value between 0 and 100, with 100 representing the best possible condition and 0 representing the worst possible condition. The PCI is used by DOD, NATO, and by airports and cities worldwide. It has been adopted as ASTM standard D5340 for airfield pavements and D6433 for roads and parking lots.

For large asset systems, including pavement, the process may involve surveying a random or representative sample of approximately 5000 square feet to determine the PCI index of the entire system.

Based on the number of sample units in the total section, a certain number of these units are selected to be tested. For example, if there are 40 or more sample units, 10% are tested.

The type, extent and severity of pavement distress in each section are recorded using the ASTM Standard D 5340 method.

The PCI of each tested sample unit is calculated using the method defined in the standard. In summary, this involves calculating the distress quantities and the distress densities for each tested unit. These values are used to determine a "deduct value" which is subtracted from 100 to give the PCI value.

It is a problem known in the art that anomalies in a rating index occur when multiple levels of severity exist for the same type of fault.

For example, in one study an asphalt airfield sample with Alligator Cracking of 50% medium (M) severity and 50% low (L) severity had a lower PCI rating and was prioritized more highly for repair versus an identical sample of 100% (M) severity. This is not logical since a higher severity of faults should result in higher prioritization of repairs.

SUMMARY OF THE INVENTION

The current invention is a computer apparatus and method for processing multi-level condition data to achieve standardized prioritization of infrastructure maintenance, comprised of a processor which instantiates an object corresponding to an actual infrastructure.

Each of the objects is comprised of: a stored value associated with an infrastructure type, wherein the infrastructure type is associated with a plurality of fault_types, a plurality of stored fault_data matrices which store actual data values based on observation, wherein each stored fault_data matrix is associated with one fault_type, and wherein each stored fault_data matrix includes severity_level data values correlated with frequency_of_occurrence values to reflect the actual number of observed instances of a said fault_type corresponding to each severity_level observed for each infrastructure.

The computer apparatus claimed further includes: a processor for adjusting actual data values which invokes a consolidation function on each stored fault_data matrix that has two or more said frequency_of_occurrence values which do not equal zero, wherein the consolidation function adds two or more frequency_of_occurrence values within the stored fault_data matrix to produce a value Fsum and sets at least one of the frequency_of_occurrence values to Fsum and at least one of the frequency_of_occurrence values to zero to transform said actual data values to produce an adjusted data set.

The computer apparatus further includes: an index processing component which extracts data from the adjusted data set to produce an adjusted index value associated with each of the adjusted data sets and extracts data from the actual data values to produce an actual index value associated with the actual data values, and an index update component which compares magnitudes of the adjusted index values and the actual index value to select the index value having the largest magnitude and associates that index value with largest magnitude with the infrastructure.

TERMS OF ART

As used herein, the term "actual" means data reflecting an observed condition without adjustment.

As used herein, the term "adjusted" means data which has been mathematically adjusted or modified.

As used herein the term "associated" means correlated with one or more data values or one or more data sets for access by computations.

As used herein, the term "computer" means hardware or software having processing capability which may be bound to non-modifiable (static) values and functions.

As used herein, the term "data set" means data physically stored in a data structure.

As used herein, the term "fault" means any condition which may be associated with a need for repair, maintenance, or resource allocation, which includes but is not limited to wear, depletion, stress, faults, structural abnormalities, physical degradation, deterioration, or any other condition which may be observed in an infrastructure.

As used herein, the term "infrastructure" means any man made discrete physical entity or structure of any scale which is subject to physical inspection to assess deterioration.

As used herein, the term "object" means a virtual processing component that contains both data and data structures and code which performs operations on the data structures.

As used herein, the term "observed instances" means existence of faults in a real-world infrastructure or an image of a real-world infrastructure, as seen by a human or automated inspector.

As used herein, the term "processing component" means memory, operatively coupled with a computer processor. A processing component may be virtual.

As used herein, the term "ranking" means placing values in order based on the magnitude of each value.

As used herein, the term "standardized prioritization" means organizing infrastructures for maintenance in an order that reflects objectively ranked conditions of deterioration.

As used herein, the term "virtual" refers to software which binds to a general purposed microprocessor at run time.

DETAILED DESCRIPTION OF THE INVENTION

Figure 1:
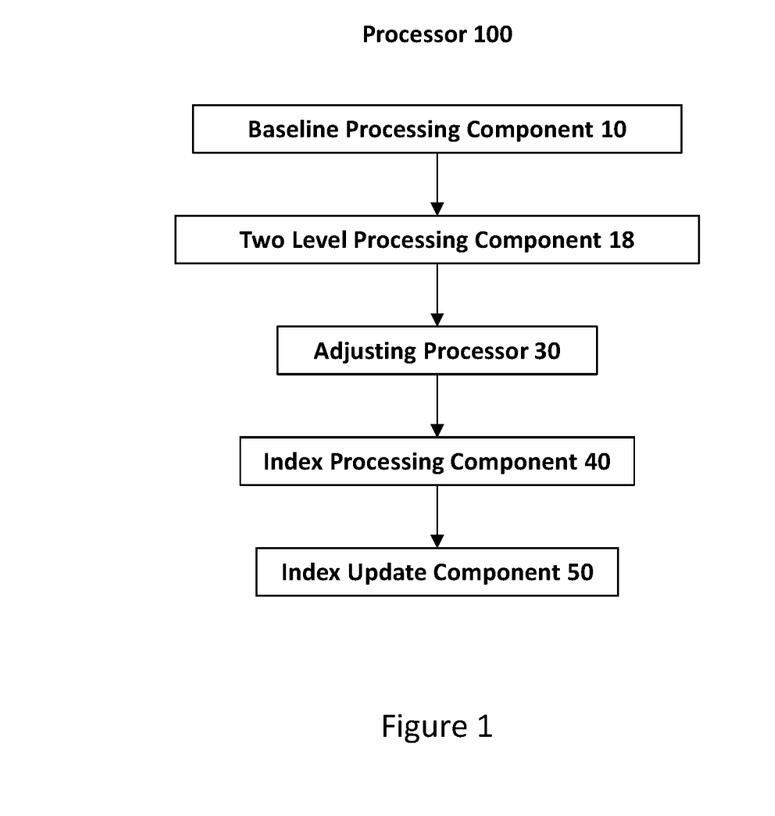
FIG. 1 illustrates a processor for correcting PCI calculation anomalies when more than one severity level of the same distress type is present in a sample unit.

FIG. 1 illustrates processor 100 for correcting PCI calculation anomalies when more than one severity level of the same distress type is present in a sample unit.

Processor 100 is an automated, specially programmed processor. Processor 100 includes a processing component to calculate an adjusted complex index.

Processor 100 includes an interface component for receiving triangulated data sets that indicate the level of severity and density (which is an occurrence percentage, e.g. frequency) for a given fault type observed in a sample unit. Baseline processing component 10 receives triangulated data sets as input. A first triangulated data set reflects observed occurrences accumulated as proportions within a first pre-specified level of quality of a single characteristic, and a second triangulated data set reflects observed occurrences accumulated as proportions within a second pre-specified level of quality of a single characteristic.

Baseline processing component 10 transforms the first data to establish a first baseline by defining $x_1$ equal to occurrences of a first said pre-specified level and a second baseline $x_2$ equal to occurrences of a second said pre-specified level. Baseline processing component 10 calculates index value of $x_1$ occurrences and $x_2$ occurrences, respectively, in said item of interest defined by said complex index, $I(x_1, x_2)$, where $I(x_1, x_2)$ is obtained from a set of pre-specified relationships, such that said proportions of $x_1$ and $x_2$ are each greater than zero; defining $(x_1+x_2)$ as $X_2$; and letting $x_1$ approach zero and $x_2$ approach $X_2$ such that $I(x_1, x_2)$ is equal to $I(0, X_2)$ when $I(x_1, x_2)$ is less than $I(0, X_2)$.

PCI two level processing component 18 calculates a PCI index consistent with the ASTM standard D 5340 method. PCI two level processing component 18 receives values $x_1$ and $x_2$.

In one exemplary embodiment, PCI is calculated for a single distress type occurrence PCI $(x_1, x_2)$=PCI of the section with single distress type occurrence percentages (density) of severity $x_1$, and $x_2$.

Where:
$x_1$=occurrence percent (density) of lower severity
$x_2$=occurrence percent (density) of higher severity

| Distress Density % | | PCI Value |
|---|---|---|
| Baseline: | $x_1, x_2$ | → PCI $(x_1, x_2)$ |
| Set $(x_1 + x_2) = X_2$ | → $0, X_2$ | → PCI $(0, X_2)$ |

Adjusting processor 30 changes the frequency of the higher severity level to the sum of the two original frequencies (which correspond to the lower and higher severity levels), and changes the frequency of the lower severity level to zero.

Index processing component 40 compares the value of PCI $(x_1, x_2)$ to the value of PCI $(0, X_2)$. The value of PCI $(x_1, x_2)$ should be higher (i.e., the pavement is in "better condition") when compared with PCI (0, $X_2$) since PCI (0, $X_2$) has more distress type percentage of higher severity level.

If this not the case, index update component 50 replaces the value of PCI ($x_1$, $x_2$) with PCI (0, $X_2$).

Processor 100 then populates a multi-sample matrix with the adjusted PCI's for each sample. Processor 100 then ranks all assessed roadways according to their PCI values to determine which roadways need to be repaired or replaced, and the order in which the repairs or replacements should occur.

To avoid anomalies which occur when PCI ratings are accumulated and curves plotted for same distress types having multiple severity levels in a sample unit, PCI two level processing component 18 performs the same process.

Curves should indicate that the PCI decreases, perhaps asymptotically, as the density of higher severity level incidences of a distress type increases. However, this is not always the case when a PCI is calculated for a road having two severity levels of the same distress type.

Figure 2:
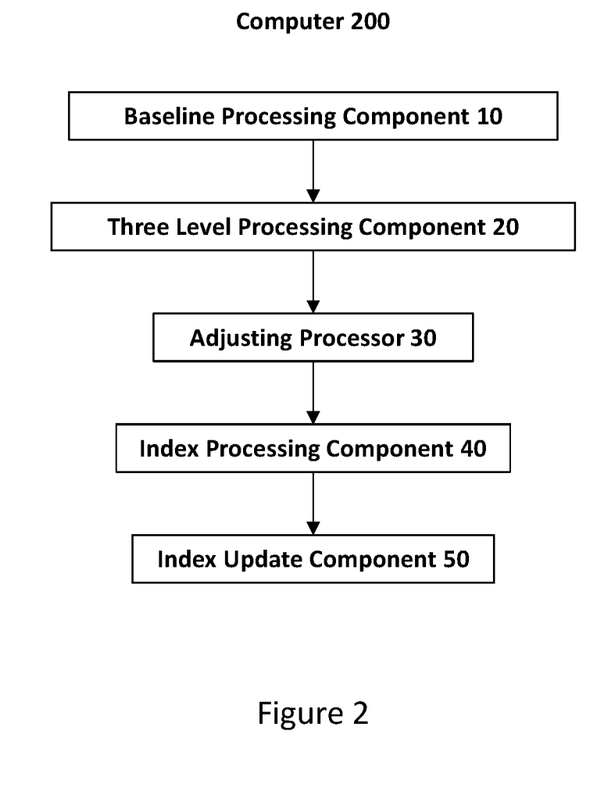
FIG. 2 illustrates a specially programmed computer for calculating a complex index for a fault with three levels of severity in the same sample unit.

FIG. 2 illustrates specially programmed computer 200 for calculating a complex index for a fault with three levels of severity in the same sample unit.

To avoid anomalies which occur when PCI ratings are accumulated and curves plotted for same distress types having multiple severity levels in a sample unit, PCI three level processing component 20 performs the same process Specially programmed computer 200 may be used for samples exhibiting up to three severity levels.

The three-severity level solution for select embodiments of the present invention is as follows, and this solution also applies to two-severity level cases:

In the exemplary embodiment shown, three level processing component 20 is programmed to receive input of severity levels (low, medium, and high) of a given distress type in the same Sample Unit and index processing component 40 calculates five corresponding PCI values as shown in the following table.

|  | Distress Density % | PCI Value |
|---|---|---|
| Baseline: | l, m, h | → PCI (l, m, h) |
| Set (l + m) = M | → 0, M, h | → PCI (0, M, h) |
| Set (m + h) = $H_1$ | → l, 0, $H_1$ | → PCI (l, 0, $H_1$) |
| Set (l + h) = $H_2$ | → 0, m, $H_2$ | → PCI (0, m, $H_2$) |
| Set (l + m + h) = $H_3$ | → 0, 0, $H_3$ | → PCI (0, 0, $H_3$) |

PCI (l, m, h)=PCI for exhibited sample distress severities of l, m, h for a single distress type.

Where:
l=low severity distress occurrence (density) percent
m=medium severity distress occurrence (density) percent
h=high severity distress occurrence (density) percent Computer 200 is programmed to compare the six PCI values in the right column of the table. If the value of PCI (l, m, h) is not higher than PCI (0, M, h), PCI (l, 0, $H_1$), PCI (0, m, $H_2$), or PCI (0, 0, $H_3$), index update component 50 will set PCI (l, m, h) equal to the highest PCI value. Thus, the adjusted (corrected) PCI will be the highest PCI value of the group.

This solution corrects PCI value anomalies created when evaluating a sample unit having a single type of fault that has multiple severity levels.

Baseline processing component 10 performs computations to establish a baseline by defining three levels of said characteristic, low, medium, and high, with a calculated index value of l occurrences of low, m occurrences of medium, and h occurrences of high in the item of interest defined by the complex index, I(l, m, h) where I(l, m, h) is obtained from a set of pre-specified relationships, such that each of said l, m and h occurrences are greater than zero.

Adjusting processor 30 establishes a set (l+m) as M and adds said l occurrences of low to m occurrences of medium to yield M and calculates I (0, M, H) from the set of pre-specified relationships; establishes a set (m+h) as $H_1$ and adds m occurrences of medium to h occurrences of high to yield $H_1$ and calculates I (l, 0, $H_1$) from the set of prespecified relationships; establishes a set (l+h) as $H_2$ and adds l occurrences of low to h occurrences of high to yield $H_2$ and calculates I(0, m, $H_2$) from the set of pre-specified relationships; establishes a set (l+m+h) as $H_3$ and adds l occurrences of low and m occurrences of medium to h occurrences of high to yield $H_3$ and calculates I(0, 0, $H_3$) from the set of pre-specified relationships; and selects the highest value from among the calculated values of I(l, m, h), I(0, M, h), I(l, 0, $H_1$), I(0, m, $H_2$), and I(0, 0, $H_3$) as the adjusted complex index value for I(l, m, h).

In select embodiments of the present invention, the estimate of the seriousness of a fault is selected from the group consisting of high, medium, and low.

In select embodiments of the present invention, the above complex index is a pavement condition index (PCI). In select embodiments of the present invention the characteristic of the above PCI is a distress in a pavement. In select embodiments of the present invention the estimate of the seriousness of the above distress is selected from the group consisting of high, medium, and low.

In select embodiments of the present invention, l represents a lower degree of seriousness than m and m represents a lower degree of seriousness than h.

In select embodiments of the present invention, the specially programmed processor is a specially programmed computer.

In select embodiments of the present invention, means for carrying out the methods are included on computer readable storage media.

In various embodiments of the invention, more than three severity or quality estimate levels may be present, and the frequency associated with at least two of the levels may be summed to replace one of the original frequencies, and at least one of the remaining frequencies may be set to zero to create an adjusted data set and calculate the index of the adjusted data set.

Figure 3A:
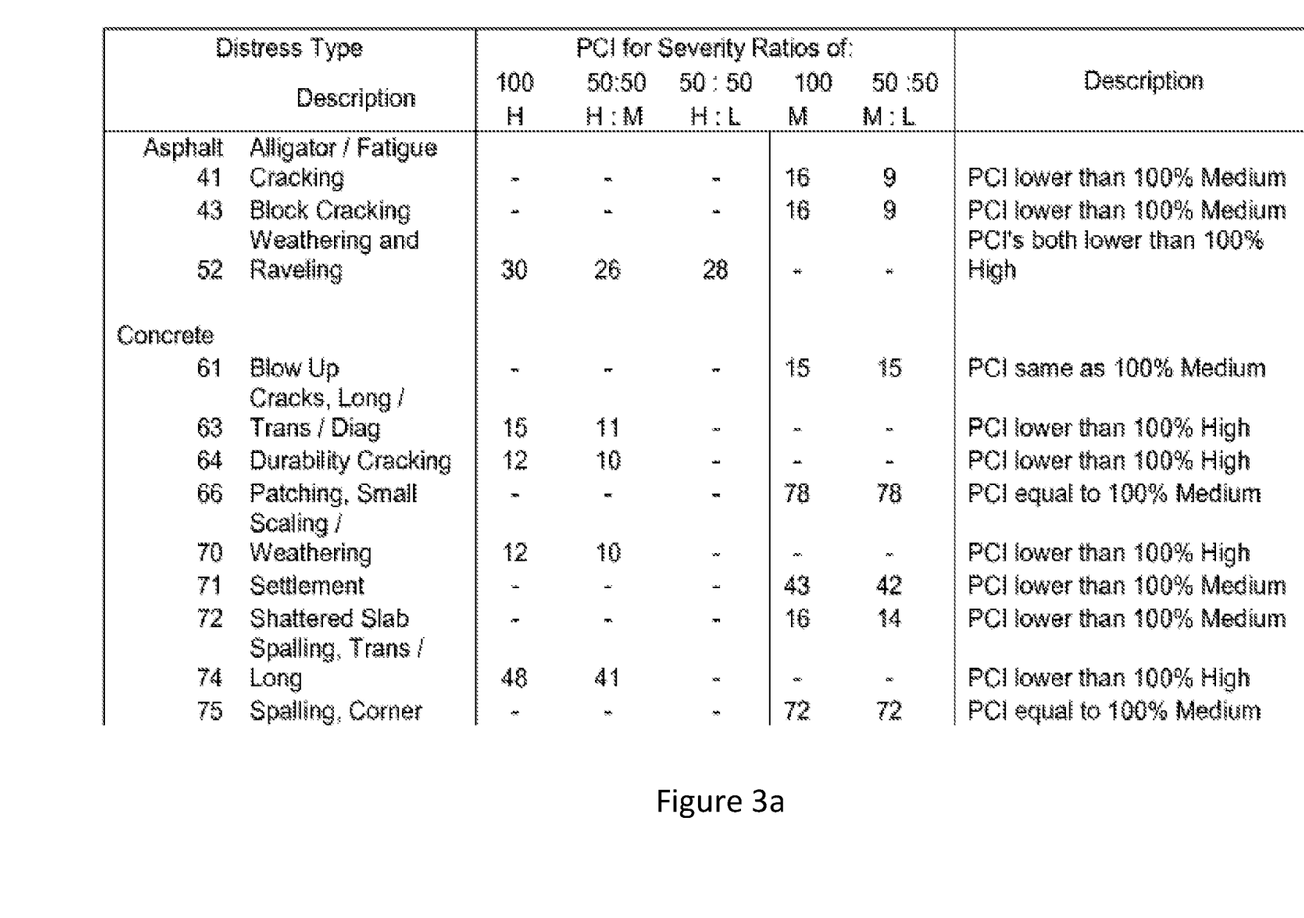
FIGS. 3a and 3b illustrate anomalies in PCI calculation when a sample unit has cracks of the same distress type with two classes of severity.
Figure 3B:
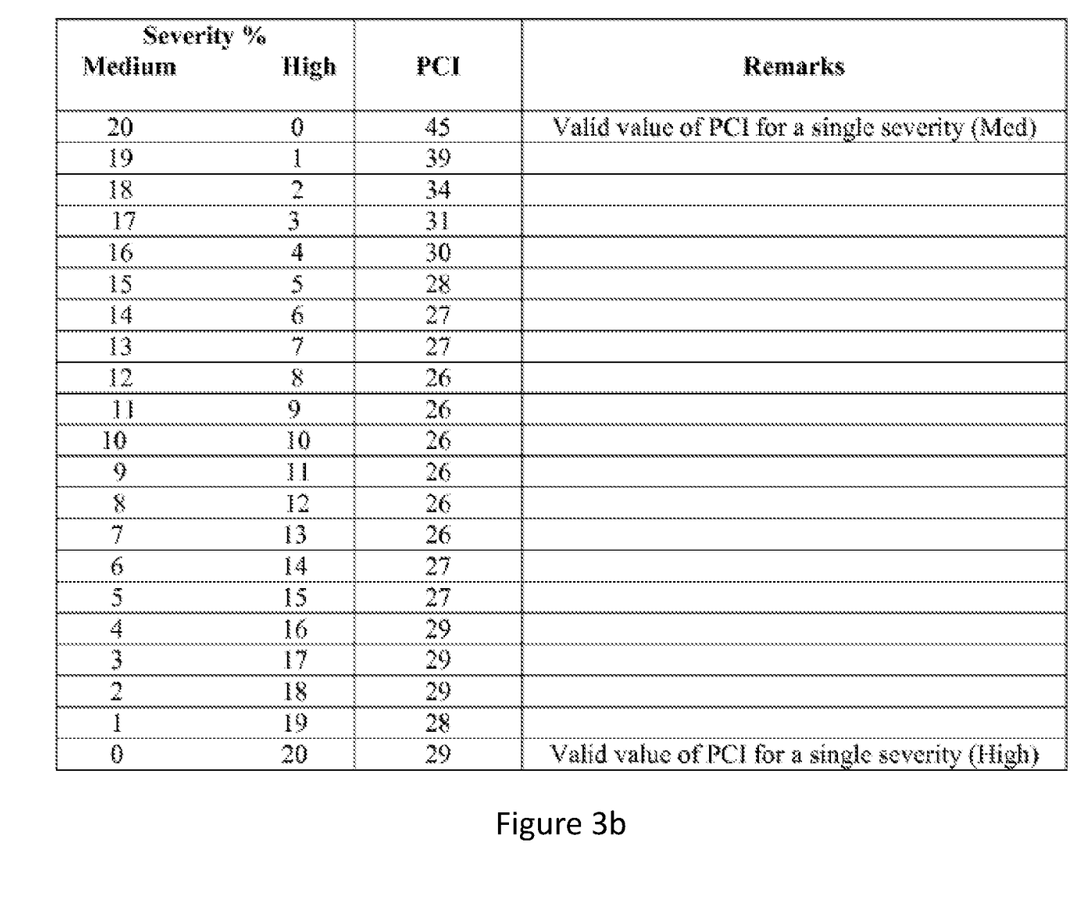

FIGS. 3a and 3b illustrate anomalies in PCI calculation when a sample unit has cracks of the same distress type with two classes of severity.

FIGS. 3a and 3b illustrate anomalies and the need for adjustment of the PCI when multiple severity levels of the same distress are present in a single Sample Unit.

From FIG. 3a, it is obvious that some adjustment needs to be made to the existing system to maintain credibility as an ASTM standard. For analysis of each anomaly, PCI ratings were collected by varying the severities for a given distress type. Initial tests were limited to two severities to simplify the analysis. The following is a brief procedure used to collect data for two severities for one distress type occurring in the same inspection sample (Sample Unit). In testing, this procedure was performed for asphalt road, concrete road, asphalt airfield, and concrete airfield samples although all are not detailed below. The procedure used is as follows:

1. A model section (asphalt/concrete, road/airfield) was created.

2. Inspection sample units were defined for both asphalt and concrete pavements.

3. A distress of a given density (% of area for asphalt pavements or % of concrete slabs for concrete pavements) was selected to test (e.g., 10% Alligator Cracking).

4. For the selected distress type and percentage, the PCI was calculated by varying two of three possible severity combinations (e.g., Low (L), Medium (M), High (H)) for that distress type). For example, if the total percent of the distress was 10%, then it could be examined as: 10% Low or 9.5% Low and 0.5% High or 9% Low and 1% High . . . to 10% High).

FIG. 3b illustrates PCI data for road asphalt section with medium and high severity alligator cracking.

Curves should indicate that the PCI decreases, perhaps asymptotically, as the density of higher severity level incidences of a distress type increases.

Figure 4A:
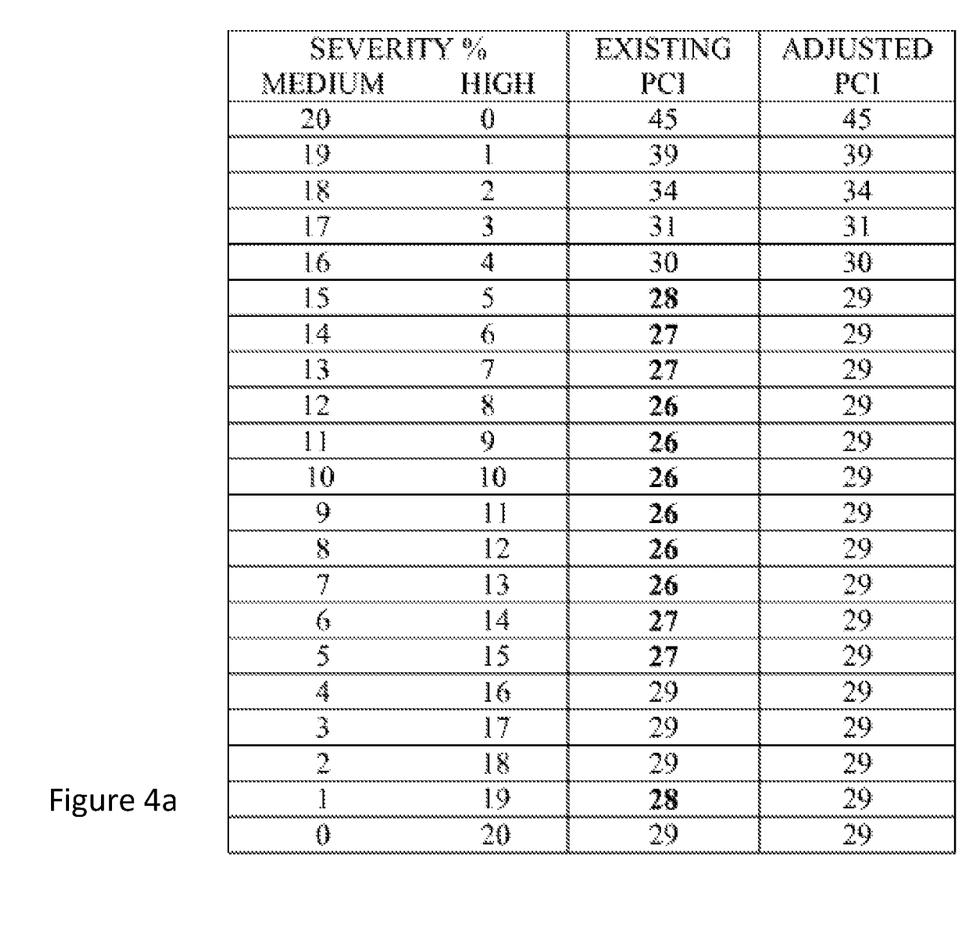
FIGS. 4a and 4b further illustrate exemplary elimination or reduction of anomalies resulting from the disclosed invention.
Figure 4B:
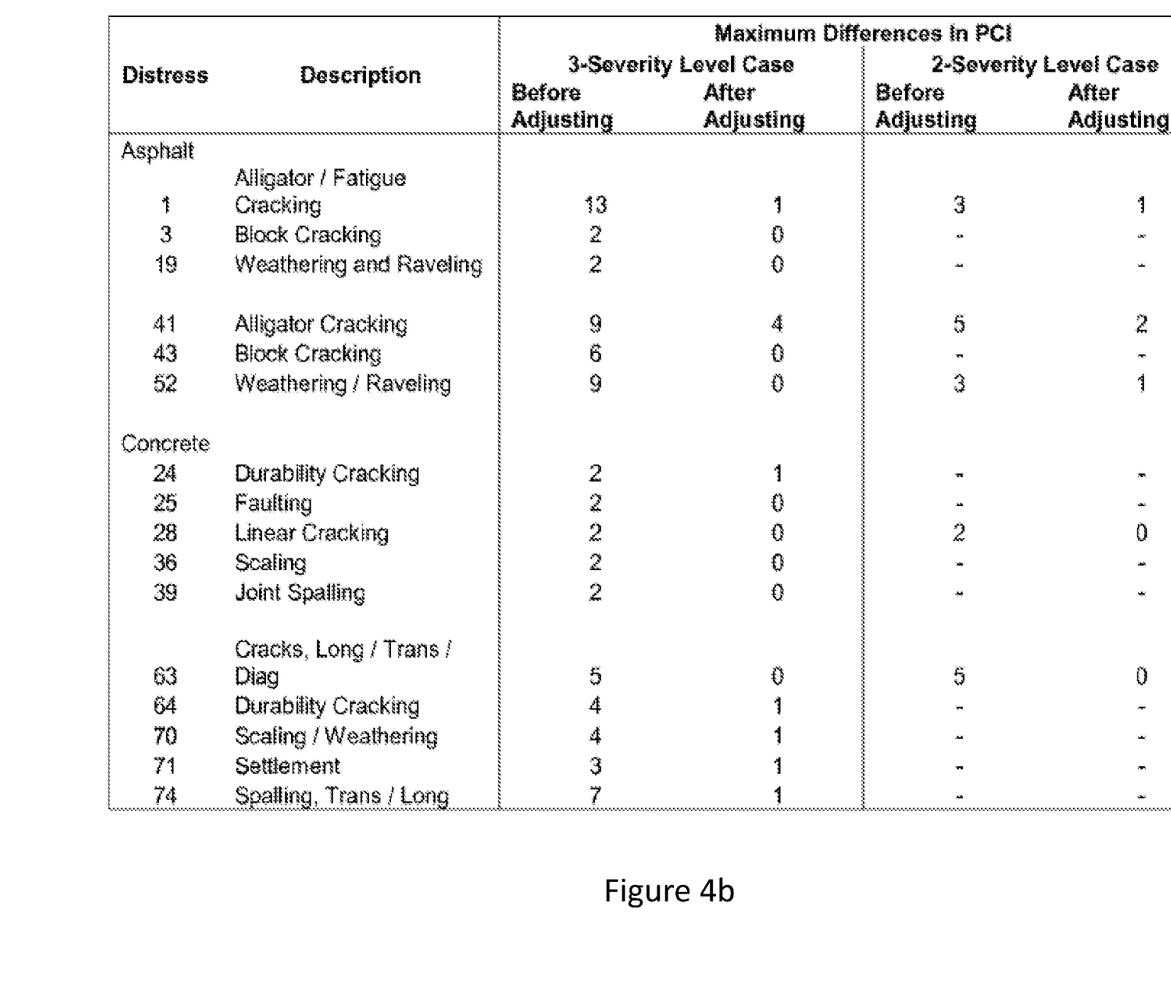

FIGS. 4a and 4b further illustrate exemplary elimination or reduction of anomalies resulting from the disclosed invention.

FIG. 4a shows the PCI values and anomalies discussed in FIG. 3b, plus the PCI values resulting from using the disclosed invention. The disclosed invention had to change the bold PCI values to an "improved PCI" to adequately represent the actual physical severity level percent.

FIG. 4b documents the size of the PCI value anomalies created by the prior art, and the effect of the disclosed invention in eliminating or reducing those anomalies. PCI value anomalies create incorrect PCI values that differ from expected PCI values by up to 13 points (before adjusting). After using the disclosed invention, most of these anomalies were eliminated or reduced to a one point difference. The largest anomaly calculated after running the recommended solution was four points, which occurred at a "failed" PCI value of 7 and thus was irrelevant since once a pavement is identified as "failed" the "degree" of failure is immaterial.

For select embodiments of the present invention a solution should be implemented as the second step in the existing PCI calculation procedure, and all other existing 10 steps follow as presently established. Airfield sections were analyzed using the above solution. Curves were plotted comparing the PCI values before and after with the mean Pavement Condition Rating (PCR) values (by experienced pavement engineers).

While the invention has been described in terms of some of its embodiments, those skilled in the art will recognize that the invention can be practiced with modifications within the spirit and scope of the appended claims. For example, although the system is described in specific examples for managing pavements, it may be used for any type of construction and thus may be useful in such diverse applications as railroads, transcontinental pipelines, marine structures, educational campuses, military installations, and the like. Performance of these structures may be tracked, maintenance scheduled and budgeted, and computer modeling of virtual systems done using select embodiments of the present invention. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Finally, it is intended that all matter contained in the foregoing description or shown in the accompanying drawings shall be interpreted as illustrative rather than limiting, and the invention should be defined only in accordance with the following claims and their equivalents.

What is claimed is:

1. A computer apparatus for processing multi-level condition data to achieve standardized prioritization of infrastructure maintenance, comprised of:
   a baseline processor which instantiates an object corresponding to an actual infrastructure, wherein each of said objects is comprised of:
      a stored value associated with an infrastructure type, wherein said infrastructure type is associated with a plurality of fault_types;
      a plurality of stored fault_data matrices which store actual data values based on observation;
         wherein each of said plurality of stored fault_data matrices is associated with one of said plurality of fault_types; and
         wherein each of said plurality of stored fault_data matrices includes severity_level data values correlated with frequency_of_occurrence values to reflect the actual number of observed instances of a said fault_type corresponding to each severity_level observed for each said infrastructure;
   an adjusting processor for adjusting said actual data values which invokes a consolidation function on each of said plurality of stored fault_data matrices that has two or more said frequency_of_occurrence values which do not equal zero, wherein said consolidation function adds two or more frequency_of_occurrence values within said stored fault_data matrix to produce a value Fsum and sets at least one of said frequency_of_occurrence values to Fsum and at least one of said frequency_of_occurrence values to zero to transform said actual data values to produce an adjusted data set;
   an index processing component which extracts data from said adjusted data set to produce an adjusted index value associated with each of said adjusted data sets and extracts data from said actual data values to produce an actual index value associated with said actual data values; and
   an index update component which compares magnitudes of said adjusted index values and actual index value to select a largest magnitude index value and associates said largest magnitude index value with said infrastructure, wherein said largest magnitude index value corrects Pavement Condition Index (PCI) anomalies, and indicates condition of pavement for determining whether and in what order the fault types of the fault data matrices are to be addressed.

2. The apparatus of claim 1, wherein said infrastructure type is associated with a rating matrix reflecting a standardized rating system.

3. The apparatus of claim 2, wherein said standardized rating system is based on and index calculated using actual data calculated by said baseline processor.

4. The apparatus of claim 3, wherein said rating index value is a static value.

5. The apparatus of claim 4, wherein each of said plurality of standard condition index matrices corresponds to one of said infrastructure types.

6. The apparatus of claim 3, wherein said rating index value is a calculated value.

7. The apparatus of claim 2, wherein said standardized rating system is based on and index calculated by said adjusting processor using adjusted data.

8. The apparatus of claim 2, wherein said rating matrix associates said severity_level value and said frequency_of_occurrence value with a rating index value.

9. The apparatus of claim 1, which further includes a data base containing a plurality of standard condition index matrices.

10. The apparatus of claim 1, which further includes a processor which calculates a standard condition index.

11. The apparatus of claim 1, which further includes a three level processing component which invokes a function to add three or more of said frequency_of_occurrence values that are non-zero within any of said plurality of stored fault_data matrices to produce a second Fsum and a function to set one of said frequency_of_occurrence values to said second Fsum and to set one of said frequency_of_occurrence values to zero to transform said actual data values to produce a second adjusted data set.

12. The apparatus of claim 1, which further includes a user interface which receives updated data values associated with said frequency_of_occurrence values.

13. The apparatus of claim 1, wherein said apparatus simultaneously updates multiple data sets in realtime.

14. The apparatus of claim 1, wherein said apparatus ranks like types of said infrastructures based on associated said largest magnitude indexes.

15. The apparatus of claim 14, wherein each of said stored fault_data matrices is further associated with a static weighted value.

16. The apparatus of claim 1, wherein said stored fault_data matrix corresponding to said infrastructure contains static user-defined values correspond to said fault_types.

17. The apparatus of claim 1, wherein said index processing component produces said adjusted data sets for more than one said stored fault_data matrices.

18. The apparatus of claim 1, wherein said actual data values include data that is selected from a group consisting of sensed data and imaged data.

19. A method for processing multi-level condition data to achieve standardized prioritization of infrastructure maintenance, comprised of the steps of:

instantiating a plurality of objects, wherein each of said plurality of objects corresponds to an actual infrastructure;

storing a value associated with an infrastructure type, wherein said infrastructure type is associated with a plurality of fault_types;

storing a plurality of fault_data matrices which store actual data values based on observation;

wherein said stored actual data values includes frequency_of_occurrence values and each of said plurality of fault_data matrices is associated with one said infrastructure;

updating each of said plurality of fault_data matrices by adding two or more said frequency_of_occurrence values which do not equal zero to produce a value Fsum and setting at least one of said frequency_of_occurrence values to Fsum and at least one of said frequency_of_occurrence values to zero to transform said actual data values to produce an adjusted data set;

calculating an adjusted index value associated with each of said adjusted data sets and an actual index value associated with said actual data values;

comparing magnitudes of said adjusted index values and actual index value to select a largest magnitude index value; and associating said largest magnitude index value with said infrastructure associated with said actual data values and said adjusted data sets, wherein said largest magnitude index value corrects Pavement Condition Index (PCI) anomalies, and indicates condition of pavement for determining whether and in what order the fault types of the fault data matrices are to be addressed.

20. The method of claim 19, which further includes the step of ranking said infrastructure according to said largest magnitude index value.

* * * * *